(12) United States Patent  
Topitzer

(10) Patent No.: US 7,966,242 B1  
(45) Date of Patent: Jun. 21, 2011

(54) SYSTEM AND METHOD FOR HEDGING CONTRACT RISKS

(75) Inventor: Gerald F. Topitzer, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 639 days.

(21) Appl. No.: 12/036,802

(22) Filed: Feb. 25, 2008

(51) Int. Cl.
*G06Q 40/00* (2006.01)

(52) U.S. Cl. ........................................ 705/36 R; 705/37

(58) Field of Classification Search ........... 705/36 R–37
See application file for complete search history.

(56) References Cited

U.S. PATENT DOCUMENTS

2005/0144119 A1* 6/2005 Monsen et al. ................ 705/38

* cited by examiner

*Primary Examiner* — Thu Thao Havan
(74) *Attorney, Agent, or Firm* — Goodwin Procter LLP

(57) ABSTRACT

A system and method for hedging contract risks is disclosed. In one particular exemplary embodiment, a computer-implemented method for hedging contract risks may comprise: receiving information related to a supply contract between a seller and a buyer, the buyer being committed to purchase inventory from the seller over a period of time; estimating potential liquidation damages that the seller will suffer if at least one credit event causes the buyer to default on the supply contract; and providing the seller a put option, whereby, upon the at least one credit event, the seller can choose to sell a claim of liquidation damages against the defaulting buyer at a strike price, the strike price being an amount that varies based at least in part on the estimated potential liquidation damages and the time at which the at least one credit event occurs.

20 Claims, 8 Drawing Sheets

SYSTEM AND METHOD FOR HEDGING CONTRACT RISKS

FIELD OF THE INVENTION

The present invention relates generally to risk management. More particularly, the present invention relates to a system and method for hedging contract risks.

BACKGROUND OF THE INVENTION

Merchants in a supply chain may be exposed to all kinds of contract risks. One example may be "inventory risk" which generally refers to the risk of a seller suffering a financial loss due to a decline in the value of its unsold inventory and/or an inability to dispose of the inventory. A typical source of inventory risks in supply contracts is buyer default.

For instance, a seller may enter into a supply contract with a buyer, wherein the buyer is committed to purchase the seller's inventory at an agreed-on price and over a predetermined timeframe. If the buyer defaults during the term of the contract, the seller will be saddled with those goods that have been specifically purchased or prepared for delivery to the buyer.

If the buyer default is a result of insolvency or bankruptcy, it is often difficult for the seller to make the buyer fulfill its contractual obligations. In bankruptcy, the defaulting buyer's executory contracts, such as supply contracts, are cancelable by a bankruptcy court. Under the Uniform Commercial Code (U.C.C.), the seller must now use commercially reasonable efforts to resell the undelivered goods (and any reclaimed goods) at the highest possible price. Sometimes, the seller simply cannot find another buyer to take the inventory balance. Even if there is another buyer, the actual resale or liquidation price may be substantially less than the contracted price. For example, inventory values of fashion goods or technological products often decrease quickly within a few months. As a result, the seller will suffer a financial loss known as "liquidation damages."

While the seller may still have a claim of liquidation damages against the defaulting buyer who is in bankruptcy proceedings, such a claim is an unsecured debt which is subordinate to other senior debts which the buyer must satisfy first. In addition, the bankruptcy court may only recognize a portion of the seller's claim of liquidation damages. Thus, there is a significant risk that the seller cannot fully recover its claim of liquidation damages.

Similarly, if a seller goes bankrupt and defaults on a supply contract, the buyer may also suffer a significant loss. The buyer may have good reasons to enter into the supply contract, such as to ensure a steady supply of manufacturing input and/or to lock in an acceptable price. Upon seller default, the buyer may be forced to cover its needs by purchasing from other sources. However, there is no guarantee of a sufficient supply and the price may have gone up significantly. The buyer may have a claim against the defaulting seller for the cost of cover, which is the difference between the contracted price of the goods and the cost of the goods (replacement) actually purchased. The buyer's claim for the costs of cover would also be unsecured and subordinate to the senior debts the bankrupt seller might have.

A number of methods are currently available to a contracting party to hedge contract risks such as the risk of default by the other party or parties. For example, in the above-described scenario where the buyer might default due to bankruptcy, the seller may have a choice among such risk-hedging methods as factoring, trade insurance, and credit default swaps (CDS).

However, none of these methods provides a satisfactory solution that is simple, flexible, and generally available at a reasonable cost. For example, factoring (or account receivable financing) typically has a minimum tenor of six months and may require three months of due diligence work just to set it up. In addition, the factoring approach may be either unavailable to or too expensive for high-yield or distressed companies.

While trade insurance policies are relatively inexpensive for some companies, they also tend to be unavailable to high-yield or distressed companies. A typical trade insurance policy lasts at least a year. The underwriting and review process for a trade insurance policy is quite long, and so is the claims process which may include a long waiting period. For customized trade insurance policies, the underwriting and claims processes may be even more cumbersome. Furthermore, instead of receiving a full coverage, the insured may be obligated to pay a 10-20% deductible or co-insurance.

CDS contracts are not much better than factoring or trade insurance. CDS contracts typically have minimum terms of 1, 3, or 5 years and are only available with respect to companies with sufficient liquidity. Furthermore, a CDS contract does not take into account specific contracts of a reference entity. In this respect, a contingent CDS (CCDS) contract is slightly better than a CDS contract as the former references the mark-to-market value of a hypothetical derivative transaction. However, a CCDS contract still does not accurately reflect the actual contract for which a contracting party is looking to hedge its risks. As a result, CDS or CCDS contracts almost invariably over-hedge or under-hedge risks for contracting parties.

JPMorgan Chase Bank has implemented a risk-hedging product known as "account receivables put," whereby a seller may transfer to the bank a claim against a defaulting buyer for outstanding receivables. This product typically applies only to the seller's risk of losing account receivables (owed for goods/services already delivered to buyer). However, the account receivables put does not help the seller hedge other risks of damages that might result from buyer default.

In view of the foregoing, it may be understood that there are significant problems and shortcomings associated with current technologies of risk management.

SUMMARY OF THE INVENTION

A system and method for hedging contract risks is disclosed. In one particular exemplary embodiment, a computer-implemented method for hedging contract risks may comprise: receiving information related to a supply contract between a seller and a buyer, the buyer being committed to purchase inventory from the seller over a period of time; estimating potential liquidation damages that the seller will suffer if at least one credit event causes the buyer to default on the supply contract; and providing the seller a put option, whereby, upon the at least one credit event, the seller can choose to sell a claim of liquidation damages against the defaulting buyer at a strike price, the strike price being an amount that varies based at least in part on the estimated potential liquidation damages and the time at which the at least one credit event occurs.

In another particular exemplary embodiment, a computer-implemented method for protecting a first party in a contract against a risk of default by a second party may comprise: determining a schedule of potential damages that the first party might suffer if the second party defaults on the contract at one or more times during the contract term; structuring a put option that allows the first party to sell, upon a triggering event, a claim of damages against the second party at a strike price, the strike price being determined based at least in part on the schedule of potential damages; pricing the put option at a premium based at least in part on an estimated recovery rate of the claim; and providing the put option to the first party in return for the premium.

In yet another particular exemplary embodiment, a computer-implemented method for hedging contract risks may comprise: recording a supply contract between a seller and a buyer, the seller being committed to supply inventory to the buyer over a period of time; estimating potential costs of cover that the buyer will incur if at least one credit event causes the seller to default on the supply contract; and providing the buyer a put option, whereby, upon the at least one credit event, the buyer can choose to sell a claim of cost-of-cover damages against the defaulting seller at a strike price, the strike price being an amount that varies based at least in part on the estimated potential costs of cover and the time at which the at least one credit event occurs.

In still another particular exemplary embodiment, a computer-implemented system for hedging contract risks may comprise a data processor and a data storage device that are configured to: receive information related to a supply contract between a seller and a buyer, the buyer being committed to purchase inventory from the seller over a period of time; estimate, based on the received information, potential liquidation damages that the seller will suffer if at least one credit event causes the buyer to default on the supply contract; structure a put option, whereby, upon the at least one credit event, the seller can choose to sell a claim of liquidation damages against the defaulting buyer at a strike price, the strike price being an amount that varies based at least in part on the estimated potential liquidation damages and the time at which the at least one credit event occurs; determine a premium for the put option based at least in part on an estimated recover rate of the claim of liquidation damages; provide the put option to the seller in return for the premium; and record data related to the put option, the data including one or more pre-conditions that the seller must meet before exercising the put option. The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention provide for risk management techniques to hedge inventory risks and other risks that one contracting party might be exposed to as a result of another contracting party's default. Upon entering into a contract or during the term of the contract, a put option may be provided to a first contracting party. When a second contracting party defaults or otherwise fails to satisfy the contract, resulting in damages to the first contracting party, the first party may exercise the put option by in effect selling its claim of damages against the second party at a strike price. The claim of damages may be sold to a provider of the put option or an obligor designated in the put option contract. The strike price may be a predetermined amount based on an estimated amount of damages and the time of default. By exercising the put option, the first party may recover at least a portion of its financial loss. The put option may be structured and exercised in a number of ways and may offer several advantages over existing risk-hedging methods, as will be described in detail below.

Figure 1:
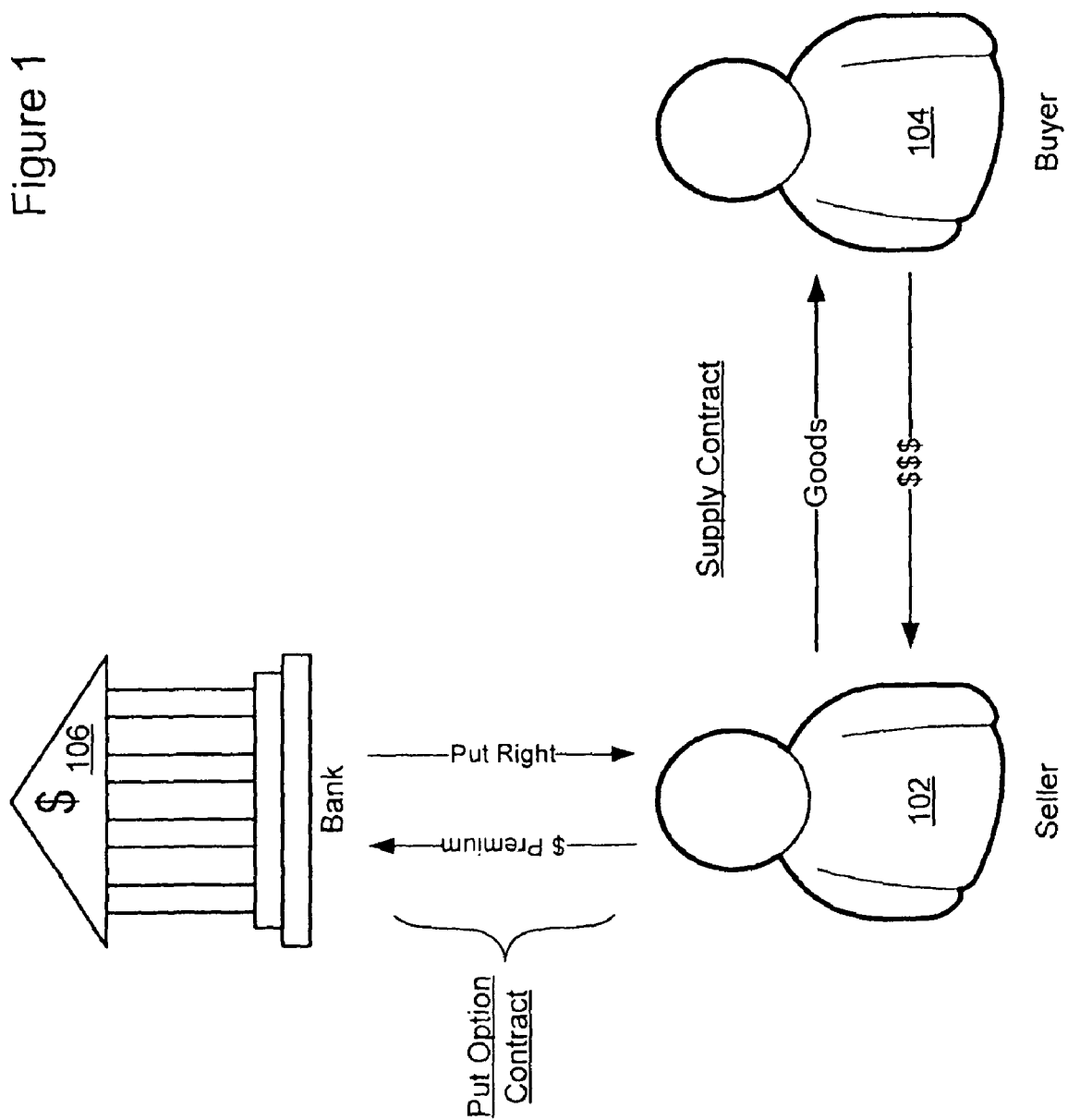
FIG. 1 shows a block diagram illustrating an exemplary method of providing a put option to a seller in accordance with an embodiment of the present invention.

Referring to FIG. 1, there is shown a block diagram illustrating an exemplary method of providing a put option to a seller in accordance with an embodiment of the present invention. In this exemplary embodiment, a supply contract may be formed between Seller 102 and Buyer 104. Buyer and Seller may each be a person, a group of persons, or an organization with legal authority to enter into a binding contract. Buyer may be committed to purchase Seller's inventory at a mutually agreed price (or according to a schedule of varying prices) over a period of time. For example, Buyer may be a department store and Seller may be a wholesale distributor of fashion apparels. Buyer may be using the supply contract to direct Seller to stock up an inventory of seasonal clothing items to ensure an ample supply in an upcoming season. For another example, Buyer may be a computer manufacturer and Seller may be an importer of computer components. The supply contract may call for a monthly delivery of certain memory chips at a relatively fixed price, and the contract term may be for a few months or even a year. With this contract, Buyer expects to have a steady supply of the memory chips over the contract term, and Seller enjoys the fixed contract price and expects to be protected against the falling price of the memory chips.

However, the benefits will flow from the supply contract only if both contracting parties are willing and able to honor their respective contractual obligations. Being forward-looking and risk-averse, Seller may be concerned about a default by Buyer, especially if Buyer's current financial health or credit-worthiness is in question. In the examples described above, a default by Buyer may cause Seller—the distributor of fashion apparel or the importer of memory chips—to be saddled with inventory items that will lose value at a fast pace. Even if Seller eventually manages to find another buyer, those inventory items may have to be liquidated at a deep discount, resulting in liquidation damages.

In order to reduce its risk exposure to liquidation damages, Seller may enter into a put option contract with a third party. The third party may be typically a financial institution (e.g., an investment bank), a risk management firm, a trade facilitator, or the like. Here, the third party that provides the put option is referred to as "Bank" (106). With the put option contract, Bank may provide Seller a right (but not an obligation) to sell its claim of liquidation damages against Buyer, upon one or more triggering events, to Bank at a strike price. In return for this right, Seller pays Bank a risk premium. The triggering events may include credit events, such as bankruptcy or insolvency, which prevent Buyer from fully performing its duties under the supply contract. The triggering events may also include a material breach of the contract, a repudiation of the contract by Buyer, and one or more missed payments on bonds or other debt instruments issued by Buyer.

The put option may be structured in a variety of ways. Typically, depending on when Buyer defaults during the contract term, Seller will suffer different amounts of liquidation damages. For example, as periodic shipments and corresponding payments are made, Seller's inventory will decrease and so does its risk exposure to liquidation damages. Therefore, a schedule of strike prices may be set up to reflect the changing estimates of liquidation damages at different times of potential buyer default. Seller or Bank may estimate the value of Seller's inventory at different times during the contract term, based on, for example, a current trend of market price and an expected inventory balance. Then, Seller or Bank may estimate potential or expected liquidation damages that Seller might suffer at the different times. Based at least in part on the estimated amount of potential liquidation damages, corresponding strike prices may be established. In Table 1 below, An exemplary schedule of inventory balance, estimated potential liquidation damages, and strike prices is laid out for a hypothetical six-month supply contract running from September 2007 to February 2008.

thereof, such as 80% (i.e., Strike Price 2). For the rest of the contract term, October 2007-February 2008, the par values and corresponding strike prices for the put option may be established in a similar fashion. That is, the par values may be a fixed percentage (i.e., 40%) of the estimated inventory balances, and the strike prices may be a fixed percentage (e.g., 100% or 80%) of the corresponding par values.

As will be appreciated by those skilled in the art, there may be other methods of establishing the schedule of par values and strike prices, some simpler and others more sophisticated than the above-described fixed-percentage relationship among the estimated inventory balance, par value, and strike price.

According to one embodiment of the present invention, the estimated inventory balance may be assumed to be linearly decreasing over the contract term. This may be the case when Seller must make an early commitment to its own source of supply in order to secure the amount of inventory that is required under the supply contract with Buyer. The estimated liquidation damages may be, or may include or otherwise effect, the penalty amount that Seller must pay its own source for failing to take delivery of the inventory balance.

According to another embodiment of the present invention, the estimated liquidation damages need not have a pre-fixed amount but may be tied to or reference one or more regional or national market indicators related to the type of inventory items, such as a benchmark price for same or similar goods or a pricing index recognized in the industry. Similarly, the strike prices need not have a pre-fixed amount but may still be predetermined in the sense that they related to the estimated inventory balance and/or liquidation damages according to one or more predetermined rules, algorithms or formulas. For example, the strike prices may be a variable percentage of the estimated liquidation damages (par value), wherein the actual percentage may depend on market conditions at the time Buyer defaults. Alternatively or additionally, the rules and/or algorithms for determining the strike prices may vary according to the type of credit event that causes Buyer to default. So, the put option may have multiple strike prices or purchase rates for different triggering events. For example, the strike price may be somewhat higher when Buyer defaults due to

TABLE 1

| Month | September 2007 | October 2007 | November 2007 | December 2007 | January 2008 | February 2008 |
|---|---|---|---|---|---|---|
| Inventory Balance | $10MM | $12MM | $14MM | $20MM | $10MM | $8MM |
| Estimated Liquidation Damages | $4MM | $4.8MM | $5.6MM | $8MM | $4MM | $3.2MM |
| Strike Price 1 (100%) | $4MM | $4.8MM | $5.6MM | $8MM | $4MM | $3.2MM |
| Strike Price 2 (80%) | $3.2MM | $3.84MM | $4.48MM | $6.4MM | $3.2MM | $2.56MM |

As shown in Table 1, if Buyer fails to take delivery in September 2007, Seller may have an estimated inventory balance for which Buyer would have paid $10 MM (MM denotes million) under the contract. Assuming Seller can liquidate the inventory balance at 60% of its contract price, Seller can recover $6 MM and will suffer $4 MM liquidation damages. The estimated amount of potential liquidation damages may sometimes be referred to as a par value or a notional amount in the put option contract. For September 2007, the corresponding strike price set for the put option may be a full 100% of the par value (i.e., Strike Price 1) or a percentage restructuring or re-organization than when Buyer files for bankruptcy to liquidate assets. Other ways of setting the strike prices may be employed depending on Seller's needs and/or Bank's ability to anticipate and absorb risks.

With the put option contract, Seller may effectively shift at least a portion of its inventory risk to Bank. Bank may price the put option at a premium to offset its own risk exposure due to its obligation to purchase Seller's claim of liquidation damages. Bank may determine the risk premium based at least in part on an estimate of recovery risk (e.g., whether and how much of Seller's liquidation damages Bank can recover from Buyer). The risk premium may be paid to Bank up front, that is, at or near the formation of the put option contract. Alternatively, the risk premium may be paid in installments, for example, in relation to the schedule of strike prices.

Figure 2:
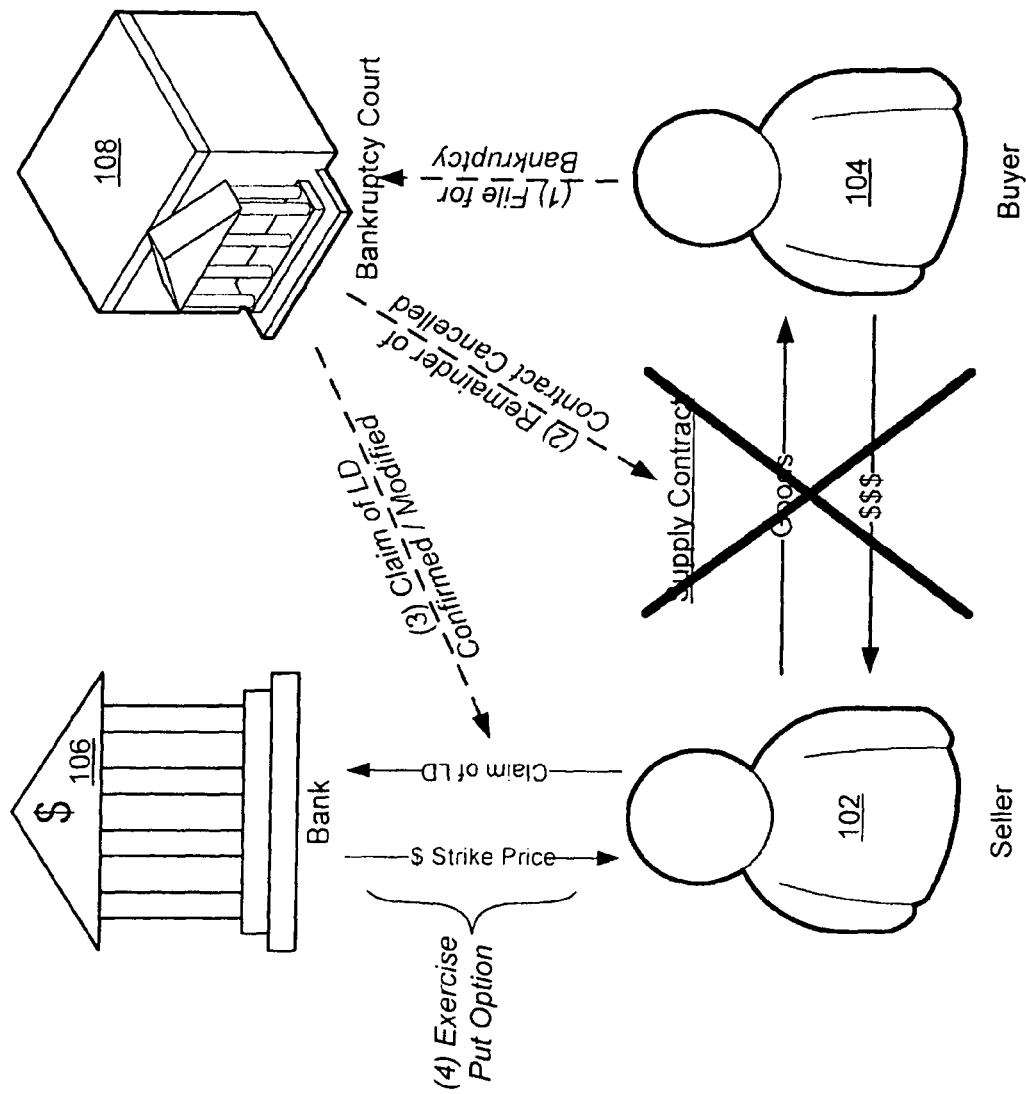
FIG. 2 shows a block diagram illustrating an exercise of a put option by a seller for a claim of liquidation damages in accordance with an embodiment of the present invention.

FIG. 2 shows a block diagram illustrating an exercise of a put option by a seller for a claim of liquidation damages in accordance with an embodiment of the present invention. Continuing with the example of Seller 102 and Buyer 104 as shown in FIG. 1, FIG. 2 now shows how Seller 102 might exercise the put option provided by Bank 106.

The put option contract may have specified one or more events that can trigger Seller's right to exercise the put option. The triggering events may include credit events which cause Buyer to default, such as bankruptcy of Buyer, restructuring of Buyer entity, Buyer failing to pay a previously agreed financial obligation (e.g., missed payments on bonds or debentures, or missed payments to Seller), or other events that significantly impairs Buyer's credit-worthiness. For simplicity, FIG. 2 shows Buyer filing for bankruptcy with Bankruptcy Court 108, which may commence a chain of events that will trigger Seller's right to exercise the put option. Depending on specific provisions of the put option contract, Seller may have to wait until Bankruptcy Court cancels the remainder of the supply contract. Then, Seller may use commercially reasonable efforts to liquidate the inventory balance, and submit its claim of liquidation damages against Buyer to Bankruptcy Court. Once the claim of liquidation damages has been confirmed or modified (e.g., reduced to a lower amount) by Bankruptcy Court, Seller may take the judicially approved claim and sell it to Bank at the appropriate strike price by exercising the put. That is, the claim of liquidation damages may be assigned to Bank, and, in return, Bank may pay the strike price which may be equal to or less than the estimated liquidation damages (par value). Now, Seller is at least partially compensated for the liquidation damages. Bank, who is legally substituted into Seller's role as a claimant-creditor, may pursue the claim of liquidation damages against Buyer. More preferably, Seller may retain and pursue the claim on Bank's behalf and pass on any amount that has been collected from Buyer.

It should be noted that the original provider of the put option need not be the same entity as the obligor with whom Seller exercises the put option. For example, Bank may contract with Seller to confer it a right to exercise the put option with another entity such as a collections company or an investment firm. Alternatively, Bank may have sold the put option contract or delegated its obligation under the put option contract to a third party. In any case, Seller should still be able to exercise the right to sell its claim of liquidation damages at the strike price pursuant to the put option contract.

Figure 3:
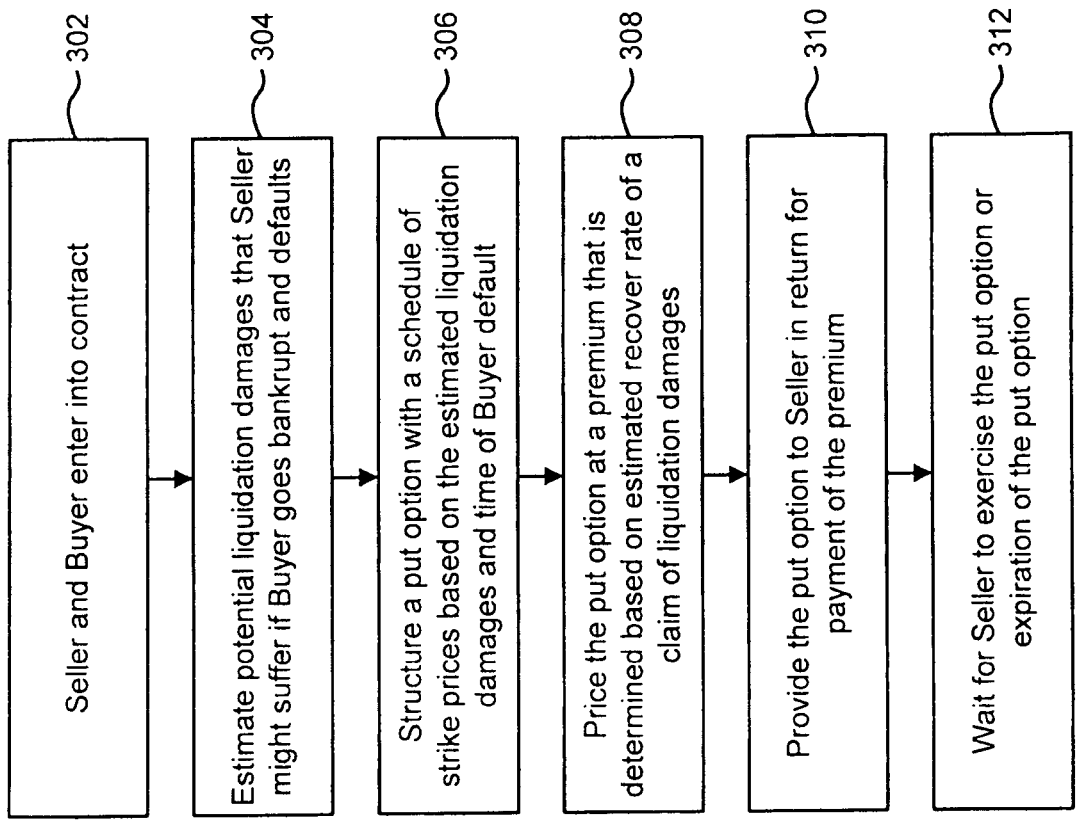
FIG. 3 shows a flow chart illustrating an exemplary method of providing a put option in accordance with an embodiment of the present invention.

FIG. 3 shows a flow chart illustrating an exemplary method of providing a put option in accordance with an embodiment of the present invention.

In step 302, Seller and Buyer may enter into a contract wherein Seller is to provide goods or services to Buyer in a predetermined timeframe and Buyer is to make payments at a contracted price.

The contract may be either a supply contract or a service contract or a combination thereof. As explained above, Seller in a supply contract may face inventory risk due to potential buyer default and change of market conditions. In the context of a service contract, Seller (or service provider) may face similar risks. For example, in preparation for a service contract that will last for months or years, Seller may incur substantial upfront expenses, for example, to hire or train additional employees and to purchase equipment or materials. The upfront expenses are incurred in reliance on Buyer's promise made in the service contract. If Buyer defaults, Seller may have a claim against Buyer to recover damages related to at least a portion of the upfront expenses. Therefore, whether it is a supply contract or a service contract, Seller may have some risk exposure to damages resulting from a default by Buyer. For simplicity, the following description will focus on liquidation damages in the context of a supply contract.

In step 304, it may be estimated as to what potential liquidation damages Seller might suffer if Buyer goes bankrupt and defaults on the supply contract. For example, the contract term may be divided into a plurality of time periods (e.g., according to shipment intervals or calendar months). For each of those time periods and assuming that Buyer defaults during that time period, Seller's inventory balance may be estimated. The inventory balance may be estimated based on the rate at which the inventory gets built up, such as Seller's production schedule or its acquisition contract(s). The estimated inventory balance may be calculated in terms of units, contract value (based on the contract price), or market value (based on then-current market price). It may then be estimated as to how much Seller can recover by liquidating the inventory balance which Buyer can no longer take. This estimate may take into account the quality and quantity of the inventory, anticipated market conditions, and Seller's prior experience, if any, in liquidating similar inventory. Based on the estimated recovery, the potential liquidation damages may be determined, for example, as a fixed or variable percentage of the value of the inventory balance.

In step 306, a put option may be structured to give Seller a future right to sell its claim of liquidation damages at one or more strike prices. The put option, contract may specify a schedule of strike prices that are determined based on the estimated liquidation damages and the time of buyer default. The par value of the put option, which varies depending on when Buyer defaults, may be established in relation to the liquidation damages amount that has been estimated in step 304 for each of the plurality of time periods. Then, for each time period, a strike price may be established based at least in part on the corresponding par value. Most typically, the strike price may be equal to or less than the par value, though it is also possible to set a strike price above the par value. The schedule of strike prices may provide an actual strike price amount for each time period or simply specify a method of calculating the strike price based on one or more factors. The relationship between the strike prices and par values or the methods of calculating the strike prices need not be uniform for all the time periods. For example, if Buyer defaults in an early part of the contract term, it may be easier for Seller to dispose of its inventory balance than if Buyer defaults later in the contract term. Therefore, the strike prices for an early default may be a lower percentage of the corresponding par values than the strike prices for a later default. Other variations may also be implemented.

In step 308, the put option may be priced at a premium that reflects the amount of risk shifted from Seller to a third party. The third party may be the provider or issuer of the put option or another entity which bears the obligation of buying Seller's claim of liquidation damages at the appropriate strike price. The risk premium may be determined based at least in part on an estimated recovery rate of the claim of liquidation damages. That is, the risk premium depends on how likely the liquidation damages can be recovered from the defaulting Buyer. The provider of the put option may need to gather information on Buyer to gauge its financial conditions and credit ratings. The provider may also want to review the underlying supply contract to ensure that there are no legal loopholes that might impact the chance of recovery. Also, the risk premium may depend on how the strike prices compare to the corresponding par values. If Seller is to sell its claim of liquidation damages at a discount (i.e., below par value), an obligor who buys the claim need not recover the full claim amount in order to break even. In that case, the provider or obligor of the put option takes less risk and demands a smaller risk premium. In any case, the inventory risk and/or other risks shifted from Seller may be priced into the premium.

In step 310, the put option may be provided to Seller in return for one or more payments of the risk premium that has been determined in step 308. A put option contract is now formed between Seller and the provider or writer of the option contract. Alternatively, the put option contract may be entered into between the provider and an entity other than Seller but with Seller as a third-party beneficiary. In another variation, the put option contract between Seller and the provider may designate a third-party obligor who is to purchase Seller's claim of liquidation damages upon triggering events.

The provider or writer of the put option contract may be an entity that provides value-added services to facilitate a supply chain. For example, one or more merchant banks may act as intermediaries in the supply chain by issuing letters of credit for buyers and selling put options to sellers. In fact, such put options may be standardized and routinely set up for active sellers (and buyers). Such standardized put options may be further traded to and/or among investors.

The put option contract may take effect at the same time as the underlying supply contract. Alternatively, the put option contract may be set up and take effect after Seller has already made one or more shipments under the supply contract but prior to any buyer default.

In step 312, the provider or obligor of the put option may wait for Seller to exercise the put option or await expiration of the put option. Seller may be allowed to exercise its put option in a number of ways upon occurrence of one or more triggering events and by meeting one or more pre-conditions, as will be described in detail below. The put option may typically have an expiration date which is related to the term of the underlying supply contract. For example, the put option may be set to expire upon a last shipment or delivery under the supply contract or within a time period after the last shipment/delivery is made. Alternatively, the put option may expire when Buyer has made its last payment to Seller or upon termination of the underlying supply contract.

Figure 4:
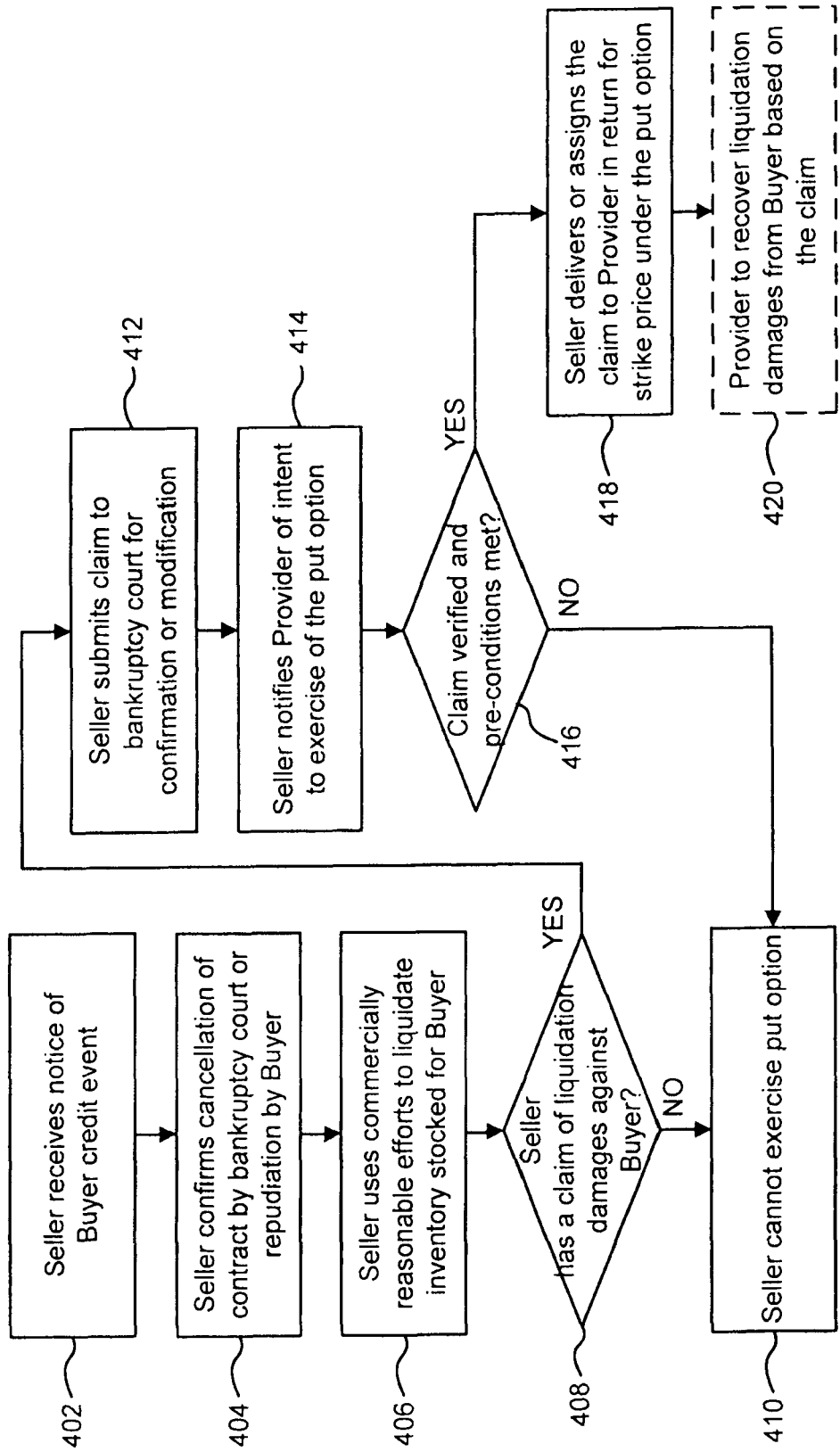
FIG. 4 shows a flow chart illustrating an exemplary method of exercising a put option in accordance with an embodiment of the present invention.

FIG. 4 shows a flow chart illustrating an exemplary method of exercising a put option in accordance with an embodiment of the present invention. Continuing with the example of the put option contract associated with the supply contract between Seller and Buyer (as illustrated in FIG. 3), FIG. 4 shows how Seller exercises the put option.

In step 402, Seller may receive a notice of a credit event that has occurred regarding Buyer. The credit event may be one that is recognized in the traditional CDS market or an event specified in Seller's put option contract. For example, Buyer may have filed for bankruptcy and is about to liquidate its assets to satisfy outstanding debts. Buyer may have defaulted on its major debt instruments and/or have had its credit ratings lowered. Or, Buyer may have been forced into restructuring or reorganization. Seller may receive a written notice from either Buyer or a trustee in bankruptcy who handles distribution of Buyer's assets to creditors. Such notice may also come from a monitoring agency or other parties.

In step 404, Seller may confirm with a bankruptcy court or other authorities that the remaining supply contract with Buyer is cancelled. Or, Seller may confirm with Buyer that it has affirmatively repudiated the supply contract or otherwise it will no longer perform under the contract.

Upon confirmation that Buyer will no longer perform its obligations under the supply contract, in step 406, Seller may use commercially reasonable efforts to liquidate the inventory that has been stocked for Buyer. Seller may try to sell as many inventory items and at as high prices as possible.

Then, in step 408, it may be determined whether Seller has a claim of liquidation damages against Buyer. If Seller has satisfied its legal obligation to mitigate damages but cannot resell the inventory balance at a price that is at least the level of the contracted price, then Seller may have a claim for the shortfalls (i.e., damages) against Buyer. If Seller does not have a legal claim of liquidation damages against Buyer, Seller will not be able to exercise its put option (step 410). If Seller does have a claim against Buyer, then, in step 412, Seller may submit that claim to the bankruptcy court or the trustee in bankruptcy for confirmation or modification. The court or trustee may fully recognize Seller's claim or may reduce it to a lesser amount. If Buyer defaults or breaches for reasons other than bankruptcy, Seller may have a judicially recognizable claim against Buyer for damages.

In step 414, Seller may notify the provider or obligor of the put option that Seller intends to exercise the put option.

In step 416, the provider or obligor may determine whether the claim of liquidation damages has been judicially approved and whether all the pre-conditions have been met. For example, some or all of the steps 404, 406, 412 and 414 may be prerequisite steps that Seller must perform before exercising the put option. There may be other commercial or legal steps Seller must take in order to be eligible to exercise the put option. If pre-conditions are not met, Seller cannot exercise the put option (step 410).

If pre-conditions are met, then, in step 418, Seller may deliver or assign the claim of liquidation damages to the provider or obligor and be paid the appropriate strike price. Typically, Seller may assign to the provider or obligor the right to payments received from Buyer, and Seller may continue pursuing the claim against Buyer on behalf of the provider or obligor. Alternatively, the provider or obligor may step into Seller's shoes as one of Buyer's creditors. In step 420, the provider or obligor may receive payment of liquidation damages directly or indirectly from Buyer. According some embodiments of the present invention, the claim of liquidation damages may be further sold or assigned to another entity.

Figure 5:
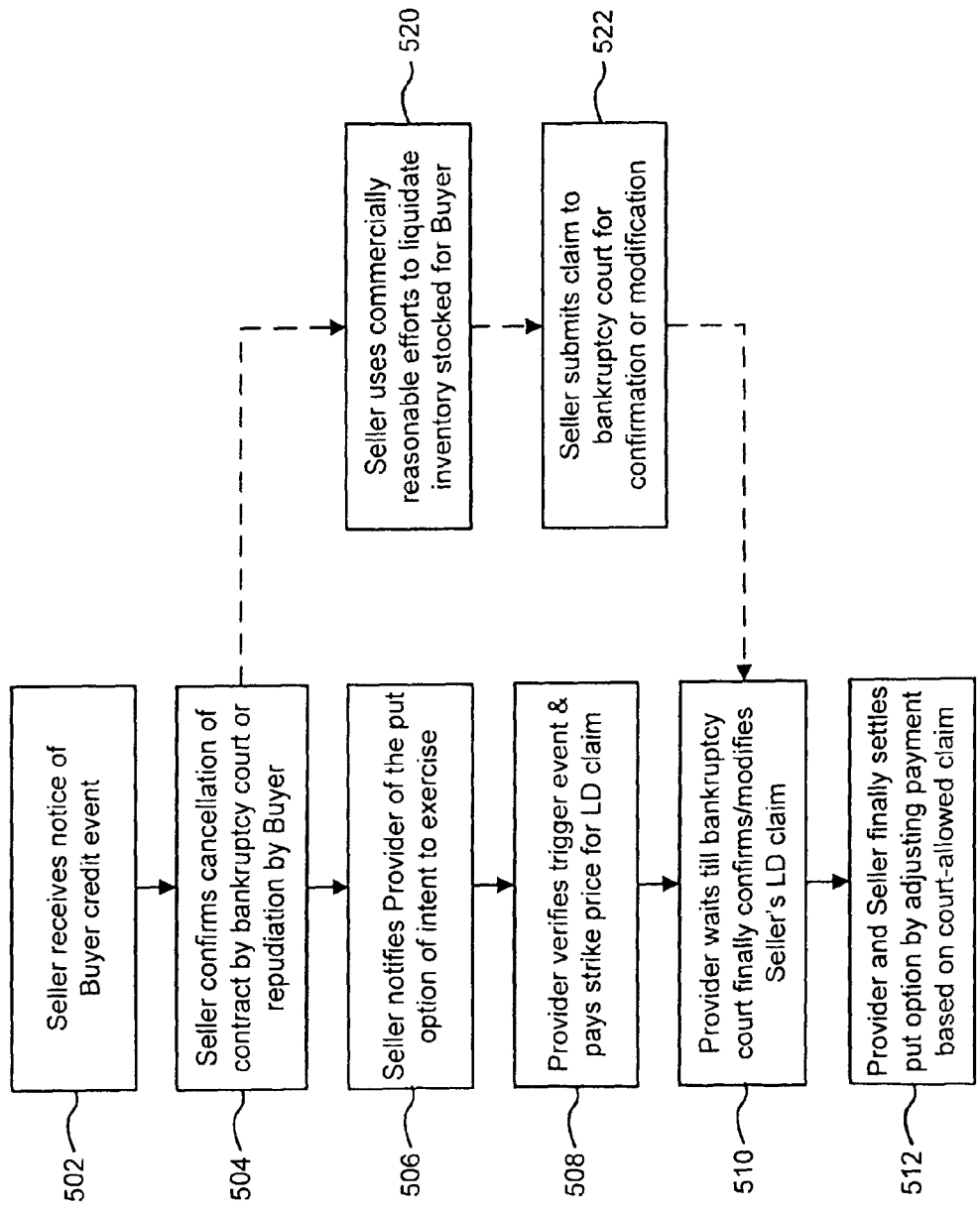
FIG. 5 shows a flow chart illustrating another exemplary method of exercising a put option in accordance with an embodiment of the present invention.

FIG. 5 shows a flow chart illustrating another exemplary method of exercising a put option in accordance with an embodiment of the present invention. This example may also be based on the exemplary put option described in connection with FIG. 3. However, the put option can be exercised in a way different from the sequence illustrated in FIG. 4.

In step 502, Seller may receive a notice of a credit event that has caused or will cause Buyer to default. For example, Buyer may have filed for bankruptcy.

In step 504, Seller may confirm the cancellation of the supply contract by a bankruptcy court or an affirmative repudiation of the supply contract by Buyer.

The put option contract may allow Seller to exercise the put option prior to any judicial approval of Seller's claim of liquidation damages against Buyer. Therefore, as soon as Seller is certain that Buyer has defaulted, Seller may notify the provider or obligor, in step 506, of Seller's intent to exercise the put option.

In step 508, the provider or obligor may simply verify that a triggering event (e.g., bankruptcy of Buyer) has indeed occurred and then pay Seller the appropriate strike price in return for its claim of liquidation damages against Buyer. The claim of liquidation damages may not have matured into a legally enforceable claim against Buyer yet. However, the provider or obligor may nevertheless allow Seller to exercise the put option, at least on a contingent basis, especially if Seller is a trustworthy company.

In the meantime, Seller may still be obligated to take some requisite steps to perfect and/or protect the claim of liquidation damages against Buyer. For example, in step 520, Seller may use commercially reasonable efforts to liquidate the inventory balance at the highest price. In step 522, upon assessing its liquidation damages, Seller may submit a claim to the bankruptcy court for confirmation or modification. Seller may be required to use its best efforts or use predetermined legal procedures to ensure the validity and a high recovery amount of the claim. Alternatively, Seller may be allowed to exercise the put option even before it liquidates its inventory and/or prior to any judicial validation or confirmation of its liquidation damages. For example, for a seller with a good credit or reputation, the provider or obligor may allow an early exercise of the put option subject to a subsequent adjustment of the actual payout amount. That is, if the bankruptcy court later validates a claim amount different from the actual payout amount in the early exercise, the seller may receive an additional amount for any underpayment or may credit the obligor for any overpayment.

Then, in step 510, the provider or obligor may wait for the bankruptcy court to finally confirm or modify Seller' claim of liquidation damages against Buyer.

In step 512, the provider or obligor and Seller may finally settle the put option by adjusting payments based on the claim amount that has been allowed by the bankruptcy court. For instance, if the judicially approved claim amount is less than the notional amount on the put option for which a payment of the strike price is made, Seller may need to refund a portion of the strike price to the provider or obligor.

Figure 6:
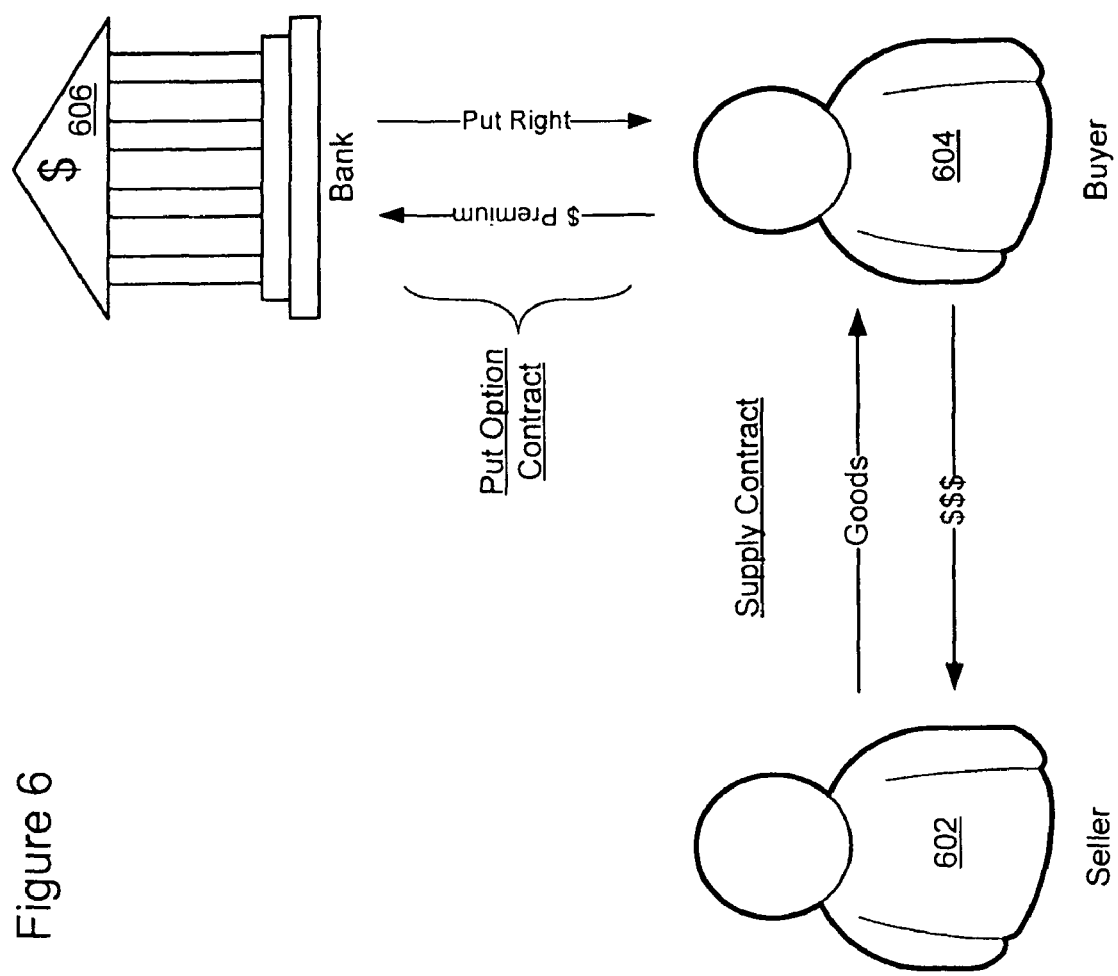
FIG. 6 shows a block diagram illustrating an exemplary method of providing a put option to a buyer in accordance with an embodiment of the present invention.

FIG. 6 shows a block diagram illustrating an exemplary method of providing a put option to a buyer in accordance with another embodiment of the present invention. Similar to the supply contract illustrated in FIG. 1, a Seller 602 may be committed to sell goods to Buyer 604 at an agreed price and within a timeframe. Here, however, it is Buyer who might be concerned about potential default by Seller.

In order to minimize its risk exposure to costs of cover should Seller default, Buyer may enter into a put option contract with a third party. The third party may be typically a financial institution (e.g., an investment bank), a risk management firm, a trade facilitator, or the like. Again, the third party that provides the put option is referred to as "Bank" (606). With the put option contract, Bank may provide Buyer a right (but not an obligation) to sell its claim of cost-of-cover damages against Seller, upon one or more triggering events, to Bank at a strike price. In return for this right, Buyer pays Bank a risk premium. The triggering events may include credit events, such as bankruptcy or insolvency, which prevent Seller from fully performing its duties under the supply contract.

The put option may be structured to account for the different time periods during the contract term when Seller might default. In each of the different time periods, Buyer might suffer different amount of damages depending on market conditions (e.g., price and availability of the goods needed) and Buyer's own supply needs. Therefore, a schedule of strike prices may be set up to correspond to the changing estimates of costs of cover at different times of potential seller default. Depending on Buyer's needs and/or Bank's ability to absorb risks, the strike prices may be established in relation to the estimated amount of cost-of-cover damages (par values) according to a variety of methods.

With the put option contract, Buyer may effectively shift at least a portion of its risk to Bank. Bank may price the put option at a premium to offset its own risk exposure due to its obligation to purchase Buyer's claim of costs-of-cover damages. Bank may determine the risk premium based at least in part on an estimate of recovery risk (e.g., whether and how much Bank can recover Buyer's claim of damages from Seller).

Figure 7:
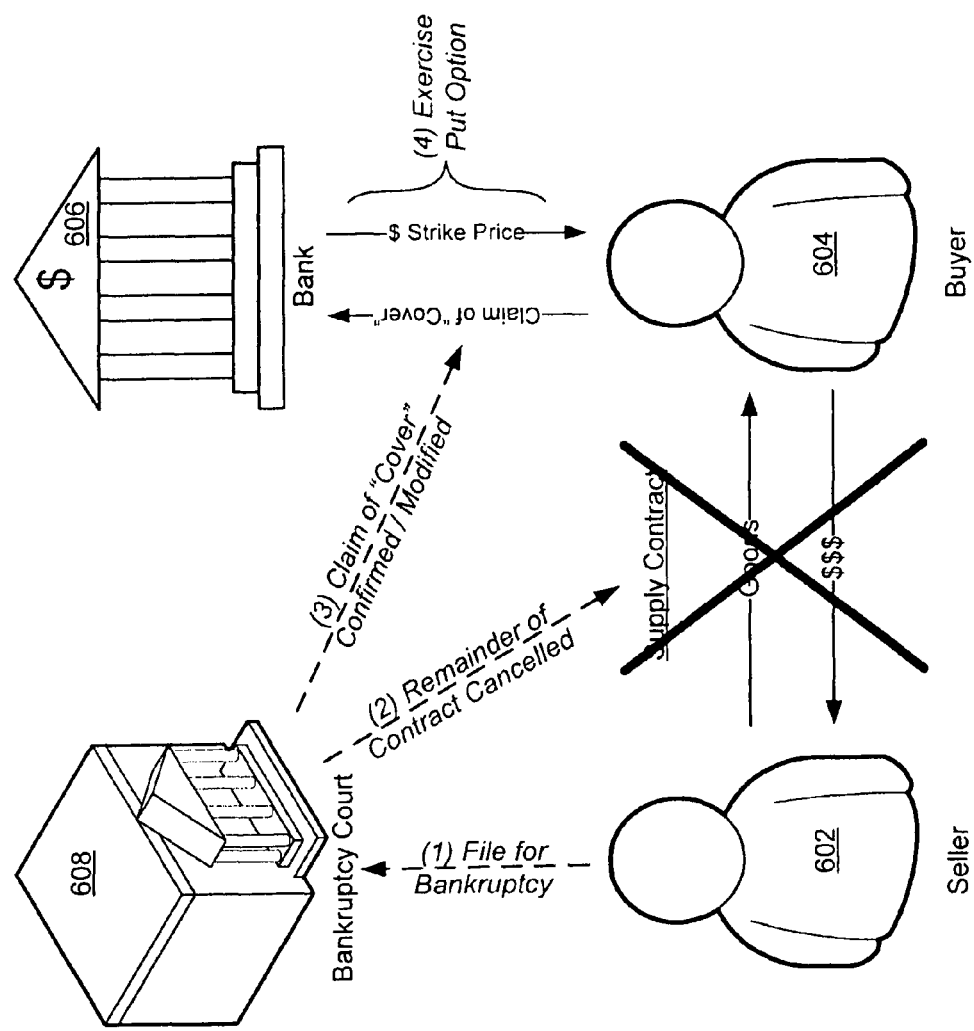
FIG. 7 shows a block diagram illustrating an exercise of a put option by a buyer for a claim of cost-of-cover damages in accordance with an embodiment of the present invention.

FIG. 7 shows a block diagram illustrating an exercise of a put option by a buyer for a claim of cost-of-cover damages in accordance with an embodiment of the present invention. Continuing with the example of Seller 602 and Buyer 604 as shown in FIG. 6, FIG. 7 now shows how Buyer 604 might exercise the put option provided by Bank 606.

The put option contract may have specified one or more events that can trigger Buyer's right to exercise the put option. The triggering events may include credit events which cause Seller to default, such as bankruptcy of Seller, restructuring of Seller entity, Seller failing to pay a previously agreed financial obligation (e.g., bonds or debentures), or other events that significantly impairs Seller's credit-worthiness. For simplicity, FIG. 7 shows Seller filing for bankruptcy with Bankruptcy Court 608, which may commence a chain of events that will trigger Buyer's right to exercise the put option. Depending on specific provisions of the put option contract, Buyer may have to wait till Bankruptcy Court cancels the remainder of the supply contract. Then, Buyer may use commercially reasonable efforts to purchase goods from other sources, and submit its claim of cost-of-cover damages against Seller to Bankruptcy Court. Once the claim has been confirmed or modified (e.g., reduced to a lower amount) by Bankruptcy Court, Buyer may take the judicially endorsed claim and sell it to Bank at the appropriate strike price. That is, the claim of cost-of-cover damages may be assigned to Bank, and, in return, Bank may pay the strike price which may be equal to or less than the estimated costs of cover (or par value). Now, Buyer is at least partially compensated for its actual costs of cover. Bank, who is legally substituted into Buyer's role as a claimant-creditor, may pursue the claim of liquidation damages against Seller.

As shown in FIGS. 6 and 7, a put option may be provided to protect a buyer as well as a seller in a supply contract. Many of those details or variations described above in the implementation of a seller's put option may be applicable or adaptable to a buyer's put option. Some differences may exist. For example, under U.C.C., when a seller defaults, a buyer is permitted but not required to find another source of the same type of goods. In anticipation of the fact that the buyer might choose not to seek cover but to pursue other remedies, a put option or a similar contract may be configured to provide some protection against the risk of not being able to recover damages from the defaulting seller.

According to embodiments of the present invention, the above-described put option contracts may be particularly useful to trading parties in commodity markets. The underlying contracts may be related to all kinds of commodities such as agricultural products, livestock and meat, energy, precious metals, and industrial metals, etc. Especially in energy trading, one party's default, coupled with market fluctuations, may cause a counterparty to suffer huge losses. Therefore, a party in an energy trading contract may find it beneficial to purchase a put option, in accordance with embodiments of the present invention, to protect itself against any or all events that might prevent the other party from honoring the trade.

Figure 8:
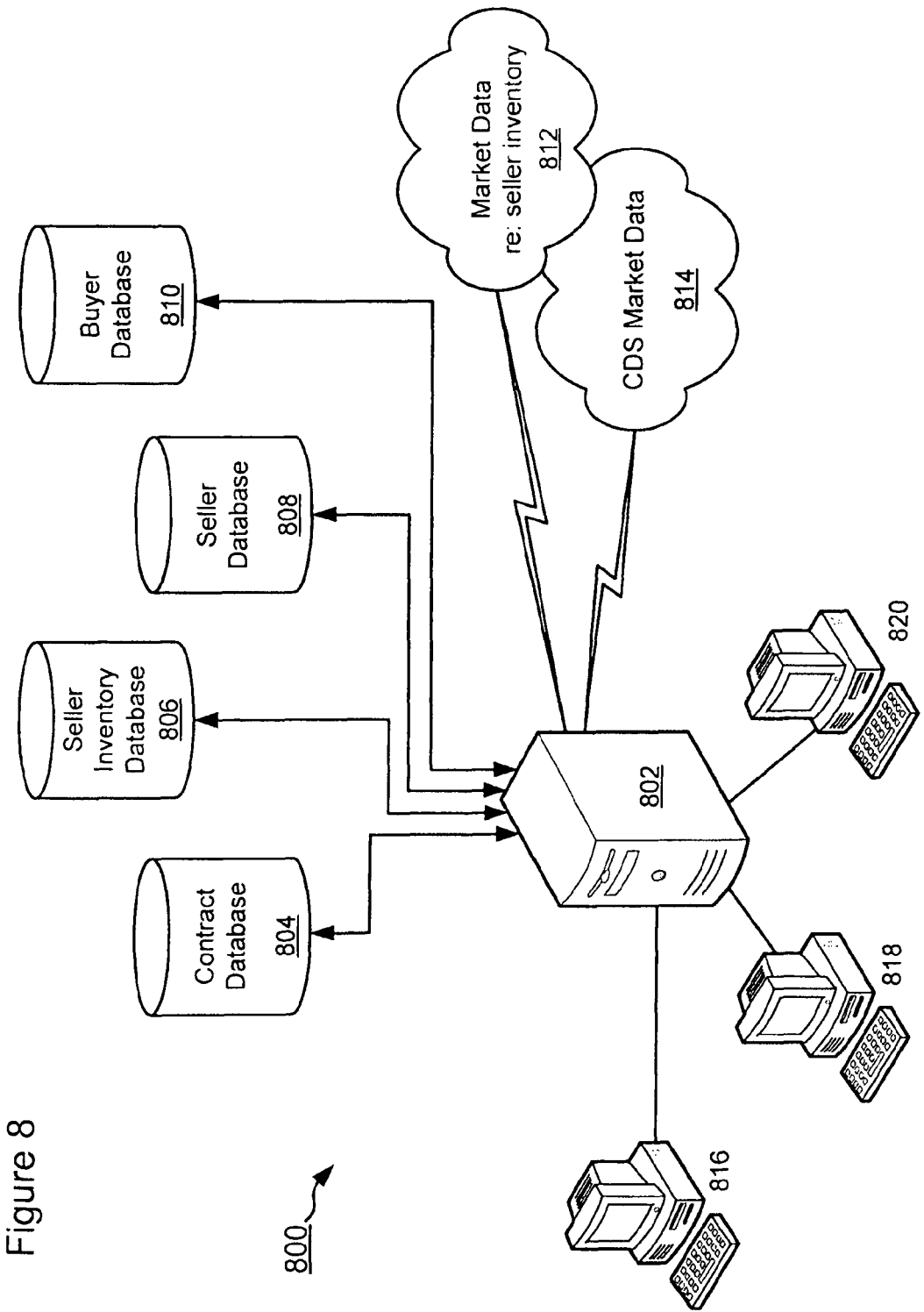
FIG. 8 shows a block diagram illustrating an exemplary system for hedging contract risks in accordance with an embodiment of the present invention.

FIG. 8 shows a block diagram illustrating an exemplary system 800 for hedging contract risks in accordance with an embodiment of the present invention.

The system 800 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system 600 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 800 may comprise a data processor 802 that is coupled to a plurality of databases or data sources. For example, the data processor 802 may communicate, locally or remotely, with a Contract Database 804 that records information related to at least one contract, a Seller Inventory Database 806 that records information related to one or more sellers' inventory (e.g., type of goods, cost of acquiring, inventory level), a Seller Database 808 that records financial and/or credit data on the one or more sellers, and a Buyer Database 810 that records financial and/or credit data on one or more buyers. According to one embodiment of the present invention, the Seller Database 808 and the Buyer Database 810 may be combined into a single database that records information on contracting parties. The data processor 802 may be further coupled to or communicate with market information systems to receive, for example, market data 812 regarding seller inventory and CDS market data 814 (credit ratings of contracting parties and their CDS spreads). With the various data inputs, the data processor 802 may perform a variety of functions related to the structuring and pricing of put option contracts as well as the administration of option exercising. For example, the data processor 802 may take the inputs of contract data, seller inventory data, seller and buyer data and perform a risk analysis based upon these input data. The data processor 802 may then output option parameters such as notional amounts, strike prices, and risk premiums. These parameters may be further recorded in one or more electronic documents to define a put option. In addition, the data processor 802 (or another data processor) may receive a signal or instruction that indicates the occurrence of a triggering event or an option-holder's intent to exercise a put option. The data processor 802 (or another data processor) may then process (i.e., analyze and transform) the data related to the put option contract and the data related to the option-holder's contract damages, and output a decision on whether the put option can be exercised and, if so, the payment amount (to the option-holder) and the claim amount (to be assigned to the option-issuer).

The system 800 may comprise a plurality of user interfaces or terminals, 816, 818 and 820, for remote or local access to the functionalities of the data processor 802 and the information in the databases or data sources (804-814). The system 800 may be typically maintained by or on behalf of a provider of option contracts, such as a financial institution or a trade facilitator. Alternatively or additionally, the system 800 may be an electronic platform, accessible by a number of parties, which facilitates the formation and implementation of put option contracts among a number of option writers and contracting parties in accordance with embodiments of the present invention. The electronic platform may further facilitate settlements and adjustments related to the put options or the put option contracts. In addition, the electronic platform may facilitate trading of the put options or the put option contracts and/or the assigning of benefits or delegation of duties related to the options and contracts.

It should be noted that, while the risk-management techniques in accordance with the present invention have been described in the context of supply contracts and with respect to liquidation damages and cost-of-cover damages, the present invention is not limited to supply contracts or the specific types of damages described above. In fact, a put option of potential claims of damages may be adapted to hedge risks of all types of contract damages.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for hedging contract risks, the method comprising:
   receiving, by at least one processor, information related to a supply contract between a seller and a buyer, the buyer being committed to purchase inventory from the seller over a period of time;
   estimating, by at least one processor, potential liquidation damages that the seller will suffer if at least one credit event causes the buyer to default on the supply contract;
   calculating, by at least one processor, a put option, whereby, upon the at least one credit event, the seller can choose to sell a claim of liquidation damages against the defaulting buyer at a strike price, the calculating further comprising determining the strike price that varies based at least in part on the estimated potential liquidation damages and the time at which the at least one credit event occurs; and
   storing, in a storage medium, data related to one or more of said supply contract, said estimated potential liquidation damages, and said calculated put option.

2. The method according to claim 1, wherein the at least one credit event is selected from a group consisting of:
   bankruptcy of the buyer;
   restructuring of the buyer entity;
   the buyer's failure to pay a previously agreed financial obligation; and other events that significantly impairs the buyer's creditworthiness.

3. The method according to claim 1, wherein the strike price is a predetermined percentage of the corresponding estimated potential liquidation damages.

4. The method according to claim 1, wherein the strike price is 100% of the corresponding estimated potential liquidation damages.

5. The method according to claim 1, wherein the put option is sold to the seller at a premium that is determined based at least in part on a recovery rate of the claim of liquidation damages.

6. The method according to claim 1, further comprising:
stipulating one or more pre-conditions that the seller must meet before exercising the put option, the one or more pre-conditions being selected from a group consisting of:
a definitive repudiation of the supply contract by the buyer;
an acknowledgement of bankruptcy or insolvency status from the buyer;
commercially reasonable efforts made by the seller to mitigate actual liquidation damages or to otherwise reduce the claim of liquidation damages;
a cancellation of the supply contract by a bankruptcy court; and
a confirmation or modification of the claim of liquidation damages by a bankruptcy court.

7. The method according to claim 1, further comprising:
receiving a delivery or assignment of the claim of liquidation damages from the seller when the seller chooses to exercise the put option; and
paying the seller the strike price in return for the delivery or assignment.

8. The method according to claim 1, wherein the put option is exercisable only after the claim of liquidation damages has been judicially confirmed or modified.

9. The method according to claim 8, wherein the strike price is a predetermined percentage of the judicially confirmed or modified claim amount.

10. The method according to claim 1, wherein the put option is exercisable prior to a judicial confirmation or modification of the claim of liquidation damages.

11. The method according to claim 10, wherein the seller receives a payment at the strike price pursuant to the put option, and wherein the payment is subsequently adjusted based at least in part on the judicially confirmed or modified claim amount.

12. The method according to claim 1, wherein the put option is provided to the seller prior to a first shipment under the supply contract.

13. The method according to claim 1, wherein the put option is provided to the seller subsequent to a first shipment under the supply contract but prior to any credit event or expiration of the supply contract.

14. The method according to claim 1, further comprising:
transferring the put option, by the seller to a party other than the buyer.

15. A computer-implemented method for protecting a first party in a contract against a risk of default by a second party, the method comprising:
determining, by at least one processor, a schedule of potential damages that the first party might suffer if the second party defaults on the contract at one or more times during the contract term;
structuring, by at least one processor, a put option that allows the first party to sell, upon a triggering event, a claim of damages against the second party at a strike price, the strike price being determined based at least in part on the schedule of potential damages;
pricing, by at least one processor, the put option at a premium based at least in part on an estimated recovery rate of the claim; and
providing the put option to the first party in return for the premium by recording and storing, in a storage medium, data related to at least one of said schedule of potential damages, said put option, and said premium.

16. The method according to claim 15, wherein:
the contract is a supply contract;
the first party is a seller and the second party is a buyer; and
the claim of damages is the seller's claim against the buyer for liquidation damages.

17. The method according to claim 15, wherein:
the contract is a supply contract;
the first party is a buyer and the second party is a seller; and
the claim of damages is the buyer's claim against the seller for cost-of-cover damages.

18. The method according to claim 15, wherein the contract is a service contract.

19. A computer-implemented method for hedging contract risks, the method comprising:
recording, in a storage medium, a supply contract between a seller and a buyer, the seller being committed to supply inventory to the buyer over a period of time;
estimating, by at least one processor, potential costs of cover that the buyer will incur if at least one credit event causes the seller to default on the supply contract;
calculating, by at least one processor, a put option, whereby, upon the at least one credit event, the buyer can choose to sell a claim of cost-of-cover damages against the defaulting seller at a strike price, the calculating further comprising determining the strike price that varies based at least in part on the estimated potential costs of cover and the time at which the at least one credit event occurs; and
storing, in a storage medium, data related to one or more of said supply contract, said estimated potential cost of cover, and said calculated put option.

20. A computer-implemented system for hedging contract risks, the system comprising:
a data processor and a data storage device that are configured to:
receive information related to a supply contract between a seller and a buyer, the buyer being committed to purchase inventory from the seller over a period of time;
estimate, based on the received information, potential liquidation damages that the seller will suffer if at least one credit event causes the buyer to default on the supply contract;
structure a put option, whereby, upon the at least one credit event, the seller can choose to sell a claim of liquidation damages against the defaulting buyer at a strike price, the strike price being an amount that varies based at least in part on the estimated potential liquidation damages and the time at which the at least one credit event occurs;
determine a premium for the put option based at least in part on an estimated recover rate of the claim of liquidation damages;
provide the put option to the seller in return for the premium; and
record data related to the put option, the data including one or more pre-conditions that the seller must meet before exercising the put option.

* * * * *